United States Patent
Mehran et al.

(10) Patent No.: US 12,200,632 B2
(45) Date of Patent: Jan. 14, 2025

(54) WIRELESS TELECOMMUNICATIONS NETWORK

(71) Applicant: BRITISH TELECOMMUNICATIONS PUBLIC LIMITED COMPANY, London (GB)

(72) Inventors: Farhad Mehran, London (GB); Richard MacKenzie, London (GB)

(73) Assignee: British Telecommunications Public Limited Company (GB)

(*) Notice: Subject to any disclaimer, the term of this patent is extended or adjusted under 35 U.S.C. 154(b) by 0 days.

(21) Appl. No.: 18/681,658

(22) PCT Filed: Jul. 7, 2022

(86) PCT No.: PCT/EP2022/068967
§ 371 (c)(1),
(2) Date: Feb. 6, 2024

(87) PCT Pub. No.: WO2023/016714
PCT Pub. Date: Feb. 16, 2023

(65) Prior Publication Data
US 2024/0267854 A1  Aug. 8, 2024

(30) Foreign Application Priority Data
Aug. 10, 2021 (GB) .................................. 2111494

(51) Int. Cl.
*H04W 52/32* (2009.01)
*H04B 7/26* (2006.01)
*H04W 52/24* (2009.01)

(52) U.S. Cl.
CPC .......... *H04W 52/32* (2013.01); *H04B 7/2606* (2013.01); *H04W 52/245* (2013.01)

(58) Field of Classification Search
CPC .. H04W 52/32; H04W 52/245; H04B 7/2606; H04L 1/0026
See application file for complete search history.

(56) References Cited

U.S. PATENT DOCUMENTS 8,213,388 B2 * 7/2012 Pathan ................ H04W 36/322
370/332
8,755,356 B1 * 6/2014 Vargantwar .......... H04B 17/336
370/333

(Continued)

FOREIGN PATENT DOCUMENTS

CN   110650479 A   1/2020
CN   110996254 A   4/2020

(Continued)

OTHER PUBLICATIONS

"Combined Search and Examination Report for received Great Britain Patent Application No. 2001528.5, mailed on Jun. 24, 2020", 7 pages.

(Continued)

*Primary Examiner* — Hai V Nguyen
(74) *Attorney, Agent, or Firm* — PRANGER LAW PC

(57) ABSTRACT

This disclosure provides a network node for a wireless telecommunications network, and a method of operating the network node, the wireless telecommunications network including a first access point configured to transmit in a first coverage area, a second access point configured to transmit in a second coverage area, and a first User Equipment (UE) connected to the first access point, the method including causing a reconfiguration of at least one of the first access point or the second access point to implement at least one of first transmission parameters or second transmission parameters.

9 Claims, 7 Drawing Sheets

(56) References Cited

U.S. PATENT DOCUMENTS

| | | | | |
|---|---|---|---|---|
| 8,767,572 | B1* | 7/2014 | Vargantwar | H04W 28/0236 370/465 |
| 8,937,968 | B1* | 1/2015 | Venkatesh | H04W 16/04 455/450 |
| 9,191,055 | B2* | 11/2015 | Lehmann | H04B 1/3838 |
| 9,282,436 | B2* | 3/2016 | Chitre | H04W 4/90 |
| 9,461,714 | B2* | 10/2016 | Cook | H04W 4/80 |
| 9,590,744 | B2 | 3/2017 | Calin et al. | |
| 9,854,540 | B2* | 12/2017 | Sun | H04W 52/246 |
| 9,860,857 | B2* | 1/2018 | Long | H04W 52/02 |
| 9,997,824 | B2* | 6/2018 | Lehmann | H01Q 1/245 |
| 10,044,926 | B2 | 8/2018 | Galor Gluskin et al. | |
| 10,477,488 | B2* | 11/2019 | Hong | H04W 52/46 |
| 10,490,881 | B2* | 11/2019 | Azad | H01Q 13/10 |
| 10,697,778 | B2* | 6/2020 | Shu | G01C 21/206 |
| 10,707,562 | B2* | 7/2020 | Shi | H04B 1/0475 |
| 10,797,783 | B2* | 10/2020 | Rappaport | H04B 7/15528 |
| 10,908,923 | B2* | 2/2021 | Wang | H04W 4/023 |
| 11,031,967 | B2* | 6/2021 | Mueck | H04W 4/029 |
| 11,039,388 | B2* | 6/2021 | Shojaeifard | H04N 23/90 |
| 11,063,625 | B2* | 7/2021 | Rappaport | H04B 1/0053 |
| 11,096,176 | B2* | 8/2021 | Lin | H04W 72/51 |
| 11,240,765 | B2* | 2/2022 | Baracca | H04W 52/283 |
| 11,241,969 | B2* | 2/2022 | Kosseifi | G05D 1/0094 |
| 11,374,635 | B2* | 6/2022 | Huang | H04B 7/0874 |
| 11,515,904 | B2* | 11/2022 | Mueck | H04W 52/367 |
| 11,528,051 | B2* | 12/2022 | Bienas | H04W 4/70 |
| 11,621,761 | B2* | 4/2023 | Raghavan | H04B 17/27 375/262 |
| 11,812,320 | B2* | 11/2023 | Shojaeifard | G06V 20/00 |
| 11,956,053 | B2* | 4/2024 | Mehran | H04W 52/283 |
| 2003/0202662 | A1 | 10/2003 | Tesauro et al. | |
| 2008/0032727 | A1* | 2/2008 | Stephenson | H04W 24/00 455/513 |
| 2009/0245199 | A1* | 10/2009 | Pathan | H04W 36/322 370/331 |
| 2013/0076523 | A1* | 3/2013 | Kwan | A61B 5/1118 340/8.1 |
| 2013/0237272 | A1* | 9/2013 | Prasad | H04B 7/0617 342/372 |
| 2013/0281021 | A1* | 10/2013 | Palin | H04W 8/005 455/41.2 |
| 2013/0283351 | A1* | 10/2013 | Palin | G06F 21/6218 726/4 |
| 2014/0128032 | A1* | 5/2014 | Muthukumar | H04W 52/0254 455/412.2 |
| 2014/0220905 | A1* | 8/2014 | Buckley | H04W 52/223 455/69 |
| 2014/0329485 | A1 | 11/2014 | Calin et al. | |
| 2015/0138992 | A1 | 5/2015 | Jover | |
| 2016/0296190 | A1* | 10/2016 | Suzuki | A61B 6/4283 |
| 2017/0064562 | A1 | 3/2017 | Jacobson et al. | |
| 2017/0353555 | A1* | 12/2017 | Lauer | H04L 67/12 |
| 2018/0138958 | A1 | 5/2018 | Asplund et al. | |
| 2018/0160377 | A1* | 6/2018 | Abramsky | H04W 52/283 |
| 2018/0292844 | A1 | 10/2018 | Kosseifi et al. | |
| 2019/0132804 | A1* | 5/2019 | Hong | H04W 52/46 |
| 2019/0272182 | A1* | 9/2019 | Wang | G01C 21/20 |
| 2020/0077257 | A1 | 3/2020 | Ekambaram et al. | |
| 2020/0298719 | A1* | 9/2020 | Kosseifi | H04W 4/44 |
| 2020/0349781 | A1* | 11/2020 | Warrier | G07C 9/00309 |
| 2021/0037458 | A1* | 2/2021 | Shojaeifard | G06V 20/10 |
| 2021/0046655 | A1* | 2/2021 | Deyle | B25J 9/1664 |
| 2021/0073449 | A1* | 3/2021 | Segev | G06F 30/27 |
| 2021/0075467 | A1* | 3/2021 | Bienas | H04B 1/7107 |
| 2022/0052867 | A1* | 2/2022 | Nakano | H04W 4/023 |
| 2022/0129918 | A1* | 4/2022 | Tang | H04W 4/021 |
| 2022/0197893 | A1* | 6/2022 | Rauhala | G06V 20/17 |
| 2022/0286931 | A1* | 9/2022 | Shojaeifard | G06V 20/00 |
| 2023/0078093 | A1* | 3/2023 | Bienas | H04W 88/023 370/329 |
| 2023/0089771 | A1* | 3/2023 | Zhang | H04W 16/28 |
| 2023/0344501 | A1* | 10/2023 | Mehran | H04B 7/0695 |
| 2024/0172053 | A1* | 5/2024 | Bagur | H04W 36/00837 |

FOREIGN PATENT DOCUMENTS

| | | | | |
|---|---|---|---|---|
| CN | 109151938 | B | 11/2020 | |
| EP | 2120358 | A1* | 11/2009 | H04W 52/18 |
| EP | 2814292 | A1 | 12/2014 | |
| EP | 2833558 | B1 | 12/2015 | |
| EP | 3373466 | A1 | 9/2018 | |
| EP | 3518587 | A1 | 7/2019 | |
| EP | 3173888 | B1* | 8/2019 | G05B 15/02 |
| EP | 3739781 | A1 | 11/2020 | |
| EP | 3764564 | A1* | 1/2021 | H04B 7/022 |
| GB | 2559556 | A | 8/2018 | |
| GB | 2559731 | A | 8/2018 | |
| GB | 2591762 | B | 9/2022 | |
| WO | 2017052923 | A1 | 3/2017 | |
| WO | 2017198293 | A1 | 11/2017 | |
| WO | 2018134629 | A1 | 7/2018 | |
| WO | WO-2020065384 | A1* | 4/2020 | |

OTHER PUBLICATIONS

"Combined Search and Examination Report received for Great Britain Patent Application No. 2001529.3, mailed on Jun. 24, 2020", 7 pages.

"Combined Search and Examination Report received for Great Britain Patent Application No. 2018792.8, mailed on Apr. 26, 2021", 8 pages.

"Combined Search and Examination Report received for Great Britain Patent Application No. 2111494.7, mailed on Jan. 31, 2022", 9 pages.

"Combined Search and Examination Report received for Great Britain Patent Application No. 2114573.5, mailed on Nov. 26, 2021", 4 pages.

"Extended European Search Report received for European Patent Application No. 20155636.2, mailed on Apr. 22, 2020", 10 pages.

"Extended European Search Report received for European Patent Application No. 20155637.0, mailed on Apr. 28, 2020", 10 pages.

"ICNIRP Guidelines for Limiting Exposure to Time-Varying Electric, Magnetic and Electromagnetic Fields (Up to 300 GHZ)", International Commission on Non-Ionizing Radiation Protection; Health Physics, vol. 74, No. 4, Jan. 1, 1999, pp. 494-522.

"International Preliminary Report on Patentability received for PCT Patent Application No. PCT/EP2020/085463, mailed on Aug. 18, 2022", 11 pages.

"International Preliminary Report on Patentability received for PCT Patent Application No. PCT/EP2021/078177, mailed Jan. 4, 2023", 15 pages.

"International Search Report and Written Opinion Received for PCT Patent Application No. PCT/EP2020/085463, mailed on Feb. 24, 2021", 15 pages.

"International Search Report and Written Opinion received for PCT Patent Application No. PCT/EP2021/078177, mailed on Dec. 23, 2021", 14 pages.

"International Search Report and Written Opinion received for PCT Patent Application No. PCT/EP2022/068967, mailed on Oct. 21, 2022", 14 pages.

"Written Opinion received for PCT Patent Application No. PCT/EP2021/078177, mailed on Oct. 13, 2022", Oct. 13, 2022, 7 pages.

Chiaraviglio , et al., "Planning 5G Networks Under EMF Constraints: State of the Art and Vision", IEEE Access, vol. 6, 2018, pp. 51021-51037.

Docomo/Telematica Instituut , "Mobility Management Threats in S3-06564", 3GPP TSG SA WG3 Security—SA3#45, S3-060xxx, 2006, 9 pages.

Garg , et al., "Learning to Predict Depth on the Pixel 3 Phones", Google AI Blog—The Latest News from Google AI, Nov. 29, 2018, 4 pages.

Ismail , et al., "Forward-Link Frequency Reuse Efficiency of Power Controlled CDMA Cellular System", Personal, Indoor and Mobile Radio Communications, vol. 2, Sep. 27, 1995, pp. 441-445.

Itoh , et al., "Performance of Handoff Algorithm Based on Distance and RSSI Measurements", IEEE Transactions on Vehicular Technology, vol. 51, No. 6, Nov. 2002, pp. 1460-1468.

(56) References Cited

OTHER PUBLICATIONS

Jang, et al., "Depth Map Generation Using a Single Image Sensor With Phase Masks", Optical Society of America, 2016, vol. 24, No. 12, 2016, pp. 12868-12878.

Khan, et al., "Recent Advancements in User Effect Mitigation for Mobile Terminal Antennas: A Review", IEEE Transactions on Electromagnetic Compatibility, vol. 61, No. 1, Feb. 2019, pp. 279-287.

Kyocera Corp, "Coverage Configuration Transition Management for ES Coverage Scenario", 3GPP TSG RAN WG3 Meeting #82, R3-132298, 2013, 5 pages.

Liao, et al., "Eavesdropping Prevention for Heterogeneous Internet of Things Systems", 15th IEEE Annual Consumer Communications & Networking Conference (CCNC), 2018, 2 pages.

Routray, et al., "Quantum Cryptography for IoT: A perspective", International Conference on IoT and Application (ICIOT), 2017, 4 pages.

Wang, et al., "Interference Management Based on Power Control and MU-MIMO", Cluster Computing, vol. 22, 2019, pp. S8581-S8588.

Wu, et al., "Safeguarding Wireless Network with UAVs: A Physical Layer Security Perspective", arXiv:1902.02472v2 [cs.IT], Jul. 24, 2019, 15 pages.

Zhang, et al., "Securing UAV Communications via Joint Trajectory and Power Control", IEEE Transactions on Wireless Communications, vol. 18, No. 2, 2018, 19 pages.

"CN Office Action for Application No. 202180072977.2, dated Jan. 17, 2024", 11 pgs.

* cited by examiner

WIRELESS TELECOMMUNICATIONS NETWORK

PRIORITY CLAIM

The present application is a National Phase entry of PCT Application No. PCT/EP2022/068967, filed Jul. 7, 2022, which claims priority from GB Application No. 2111494.7, filed Aug. 10, 2021, each of which hereby fully incorporated herein by reference.

TECHNICAL FIELD

The present disclosure relates to a wireless telecommunications network.

BACKGROUND

A wireless telecommunications network may be assessed based on one or more key performance indicators. Examples of key performance indicators include average user throughout and cell-edge user throughput (that is, throughput to a user at the edge of the serving access point's coverage area). While average user throughput may be improved using techniques such as increased transmission power, such techniques may not improve (or may even worsen) the cell-edge user throughput.

Cell-edge users may experience poor service due to interference caused by signals from neighboring access points. Current literature for cell-edge user interference mitigation includes interference suppression and interference coordination. Interference suppression (which may also be referred to as interference cancellation) utilizes signal processing techniques, such as using stronger channel codes, lower order modulation schemes and/or spatial diversity. Interference coordination techniques are generally based on coordinated resource scheduling and management between neighboring access points, such as frequency reuse, power control and coordinated multi-point. These mitigation techniques are typically used following reports of significant interference (e.g. low Signal to Interference plus Noise Ratio, SINR) from users.

SUMMARY

According to a first aspect of the disclosure, there is provided a method of operating a network node in a wireless telecommunications network, wherein the wireless telecommunications network includes a first access point configured to transmit in a first coverage area, a second access point configured to transmit in a second coverage area, and a first User Equipment, UE, connected to the first access point, the method comprising calculating a first distance between the first access point and the first UE and a second distance between the second access point and the first UE; detecting a holding form of the first UE; calculating, based on the first and second distances and further based on the holding form of the first UE, a relative strength of a first signal between the UE and the first access point relative to a second signal between the first UE and the second access point; determining that the relative strength is below a threshold; determining a first transmission parameter for the first access point and/or a second transmission parameter for the second access point such that the relative strength of the first signal between the first UE and the first access point relative to the second signal between the first UE and the second access point when implementing the first and/or second transmission parameters is above the threshold; and causing a reconfiguration of the first and/or second access point to implement the first and/or second transmission parameters.

The first distance may be between the first access point and a future location of the first UE and the second distance may be between the second access point and the future location of the first UE, and causing the reconfiguration of the first and/or second access point may be performed prior to the first UE arriving at the future location.

The method may further comprise obtaining data, captured by an optical source, wherein the first and second distances are calculated from the data. The data may be a visual image. The optical source may be an Internet of Things, IoT, sensor.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a network node for a wireless telecommunications network comprising a processor configured to carry out the first aspect of the disclosure.

According to a fourth aspect of the disclosure, there is provided a system for a wireless telecommunications network comprising one or more nodes configured to carry out the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
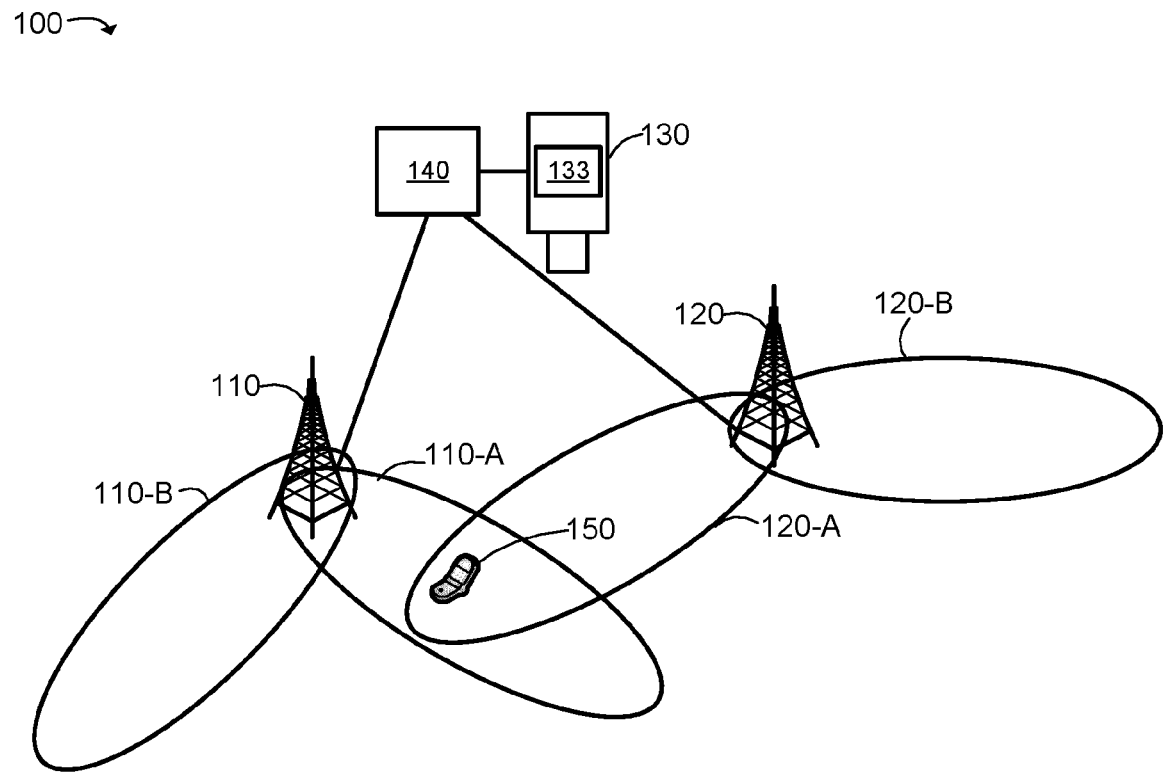
FIG. 1 is a schematic diagram of a cellular telecommunications network of embodiments of the present disclosure.

A first embodiment of a wireless telecommunications network 100 of the present disclosure will now be described with reference to FIGS. 1 to 3. In this embodiment, the wireless telecommunications network is a cellular telecommunications network 100 including a first base station 110, a second base station 120, an optical camera 130, a beam management node 140, and a first User Equipment (UE) 150. The first and second base stations 110, 120 are both configured for communications according to a cellular telecommunications protocol, such as the $5^{th}$ Generation (5G) protocol defined by the $3^{rd}$ Generation Partnership Project (3GPP). The first and second base stations 110, 120 include backhaul connections to a cellular core network (not shown).

As shown in FIG. 1, the first and second base stations 110, 120 each include a plurality of transceivers that are configured for beamforming, so that distinct beams 110-A, 110-B, 120-A, 120-B may be formed to provide voice and/or data service to users within the geographical areas defined by each beam. The first and second base stations 110, 120 may create, reconfigure and remove each beam of their respective sets of beams. One operating parameter of each transceiver of the plurality of transceivers for the first and second base station 110, 120 is the transmission power. Generally, increasing the transmission power of a transceiver increases both the capacity and the range of the transmissions. The signal strength of these transmissions decreases with distance from the transceiver (for example, by an inverse square law for propagation in free space or by some other function in a real-world example) such that each beam has a maximum coverage area outside of which the signal strength is below a minimum signal strength threshold representing the signal strength required for another wireless device to successfully decode these transmissions. The coverage area of each beam is also defined by other transmission parameters, such as its angle. In this embodiment, the first UE 150 is located within and connected to the first beam 110-A of the first base station 110.

FIG. 1 further illustrates an optical camera 130. The optical camera 130 is configured to capture images or video (i.e. a sequence of images) in the visible spectrum (that is, electromagnetic radiation having wavelengths in the range of around 400 to 700 nanometers). The optical camera 130 is in a fixed location and is positioned so as to capture images or video of a geographical area that includes the first and second base stations 110, 120. The optical camera 130 includes a processor 133 for processing captured images, which will be explained in more detail below. The optical camera 130 also includes a Global Navigation Satellite System (GNSS) module, such as the Global Positioning System (GPS) module, to determine the coordinates of its location.

Figure 2:
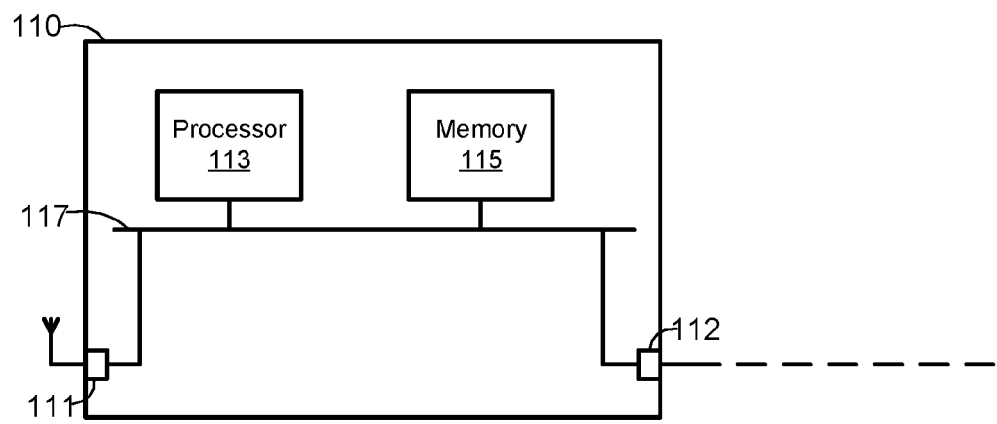
FIG. 2 is a schematic diagram of a first base station of the network of FIG. 1.
Figure 3:
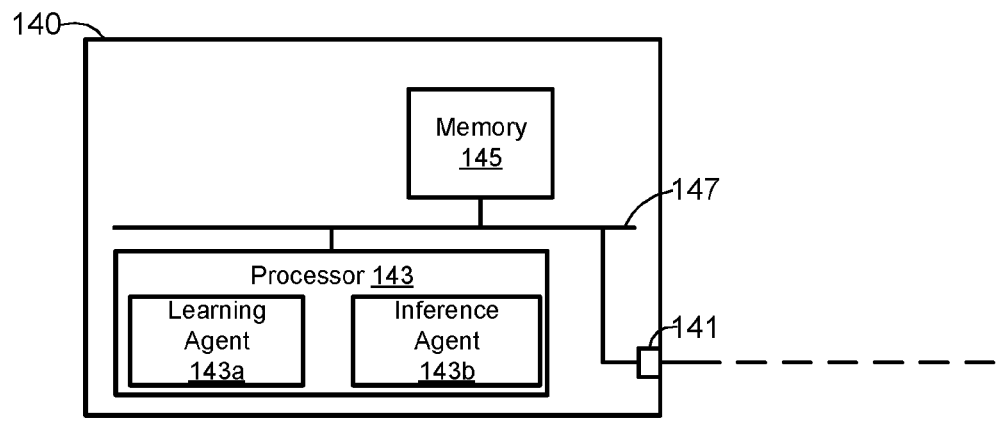
FIG. 3 is a schematic diagram of a beam management node of the network of FIG. 1.

The first base station 110 is shown in more detail in FIG. 2. The first base station includes a first communications interface 111 (connectable to an antenna), a second communications interface 112 (connectable to a core network via a backhaul connection), a processor 113 for processing wireless signals received/transmitted via the first and second communications interfaces, and memory 115, all connected via bus 117. The second base station 120 is substantially the same as the first base station 110.

The cellular telecommunications network 100 further includes a beam management node 140, residing in the core network and connected to both the first and second base stations 110, 120. As shown in more detail in FIG. 3, the beam management node 140 includes a communications interface 141, a processor 143 and memory 145, all connected via bus 147. Memory 145 includes a database of visual training data for a computer vision learning agent. In this embodiment, memory 145 includes a database storing:

1. A plurality of training images in which a first subset of these training images include a UE and a second subset of these training images do not include a UE;
2. An identifier, for each training image, of whether a UE is present or not in the training image.

The first subset of training images may cover different forms of UE (i.e. mobile telephones, tablets, etc.), different models of UE, and the UE in different holding forms (wherein a holding form is a particular way of holding the UE). The database may be periodically updated with new images.

In this embodiment, the processor 143 of beam management node 140 implements a computer vision process by a learning agent 143a and an inference agent 143b. The learning agent 143a is configured to train a machine learning algorithm, in this case a classification model, based on the visual training data in the database. The classification model maps between each training image from the database and the corresponding identifier of whether a UE is present or not in the training image. The trained classification model may then be used by the inference agent 143b.

The learning agent 143a performs periodic learning operations to update the classification algorithm, thus adapting to any new training images.

The inference agent 143b uses the trained classification model in order to output, for a given input image captured by the optical camera 130, whether a UE is present or not present in that input image.

Figure 4:
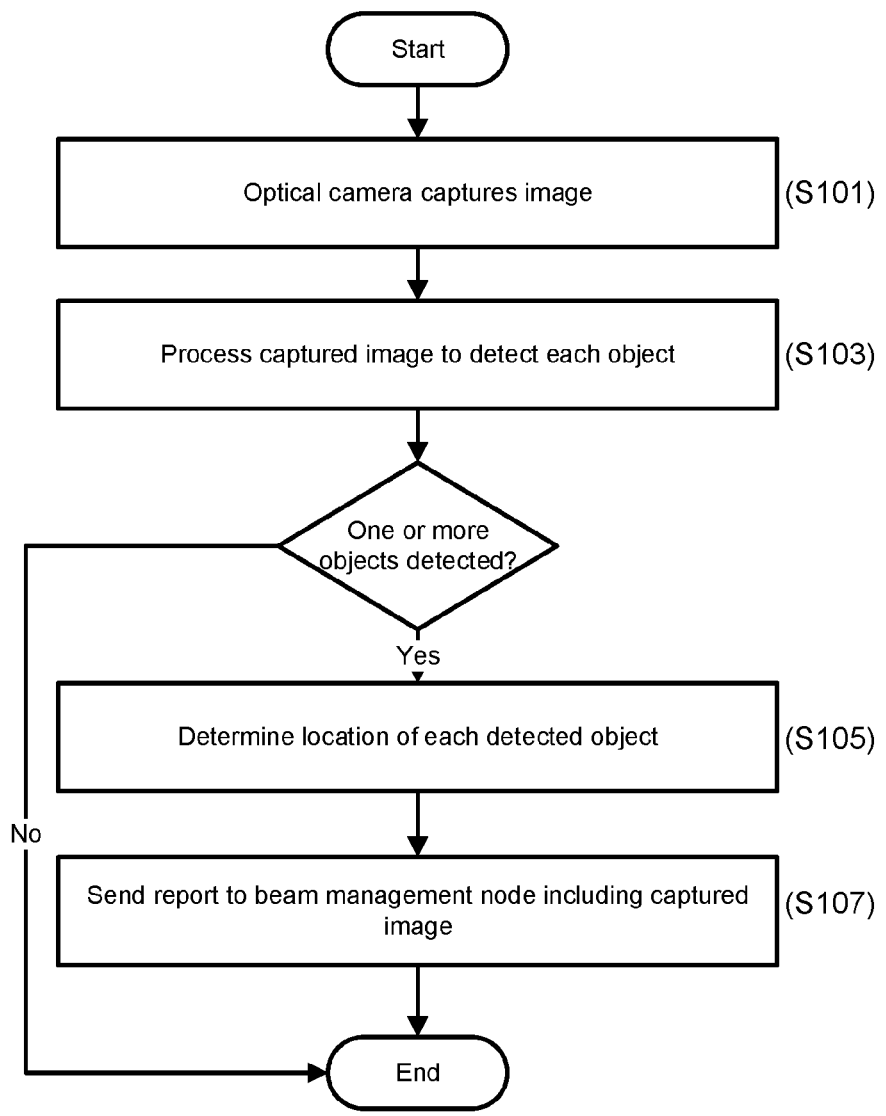
FIG. 4 is a flow diagram of a process implemented by an optical camera of the network of FIG. 1.
Figure 5:
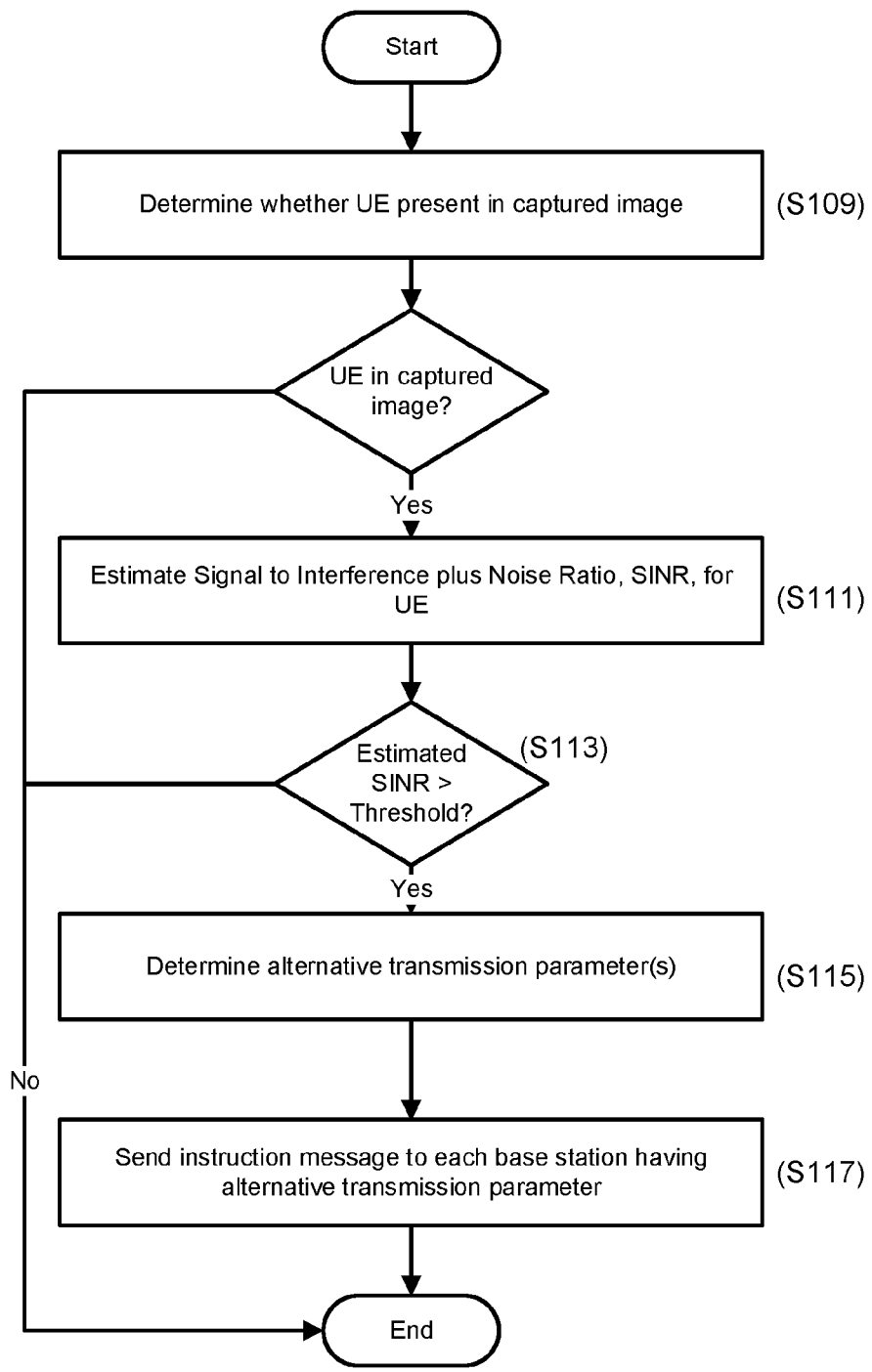
FIG. 5 is a flow diagram of a process implemented by the beam management node of the network of FIG. 1.
Figure 6:
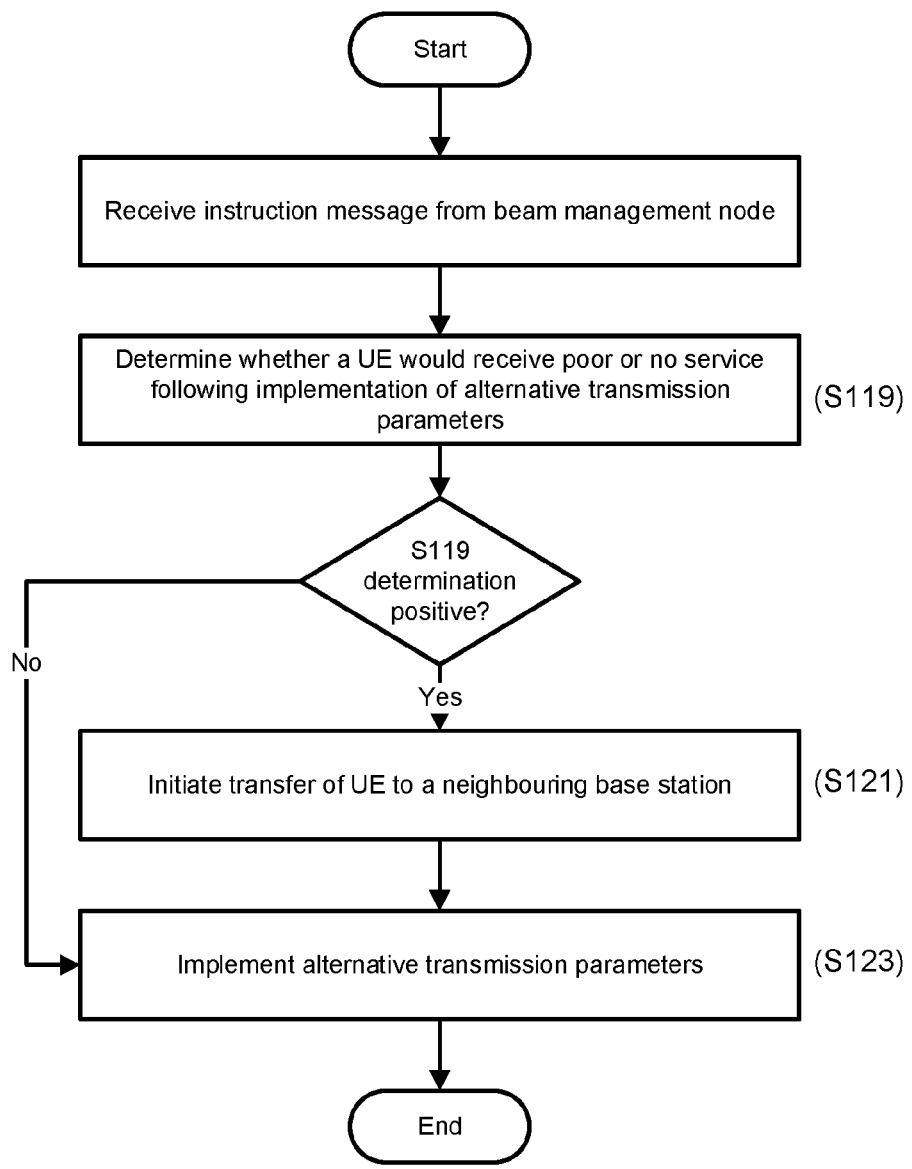
FIG. 6 is a flow diagram of a process implemented by the second base station of the network of FIG. 1.
Figure 7:
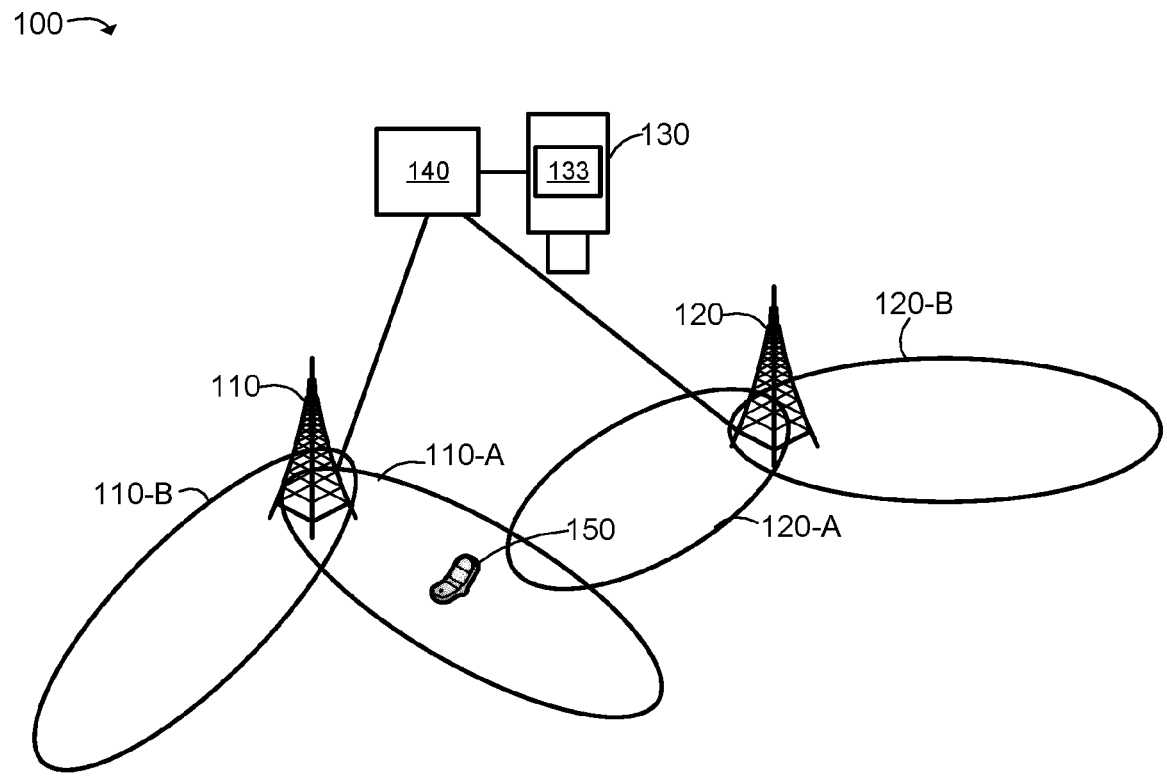
FIG. 7 is a schematic diagram of the network of FIG. 1 following implementation of the processes of FIGS. 4 to 6.

A first embodiment of a method of the present disclosure will now be described with reference to FIGS. 1 and 4 to 7. FIG. 1 illustrates the network 100 in an initial state, FIGS. 4 to 6 are flow diagrams of processes of this first embodiment of the method of the present disclosure implemented by the optical camera 130, beam management node 140 and second base station 120 respectively, and FIG. 7 illustrates the network 100 in a final state following implementation of this first embodiment of the method of the present disclosure.

In the initial state, as shown in FIG. 1, the UE 150 is positioned in an overlapping portion of the coverage area of the first beam 110-A of the first base station 110 and of the coverage area of the first beam 120-A of the second base station 120.

In S101, the optical camera 130 captures an image of the geographical region (that includes the UE 150). In S103, the optical camera's processor 133 processes the image to detect each object in the image. If no objects are detected, then the process ends or loops back to S101. In this example, the image includes a first detected object—the UE 150 (and may include one or more other objects). In S105, the optical camera's processor 133 determines the location of each detected object. In this embodiment, this is achieved using a phase detection focus technique to determine the distance between the optical camera 130 and each detected object, and further using the optical camera's location (captured by GPS). Suitable phase detection techniques include those described in International Patent Application Publication No. WO2017/052923A1, U.S. patent Ser. No. 10/044,926 and paper, "Depth map generation using a single image sensor with phase masks", Jinbeum Jang et al., Image Processing and Intelligent System Laboratory Graduate School of Advanced Imaging Science and Film.

In S107, the optical camera sends a report to the beam management node 140 including the captured image that contains the at least one detected object and a location of each detected object (determined in S105).

Turning to FIG. 5, in S109, the beam management node 140 inputs the captured image to the inference agent 143b. The inference agent 143b uses its trained classification model to output an identifier for whether each detected object in the captured image includes a UE or does not include a UE. This may involve inputting image portions of the captured image, in which each image portion includes a single detected object, so as to determine whether each image portion contains a UE or not. If there are no UE in the captured image, then the process ends or loops back to S101.

In this example, the inference agent 153b identifies that the captured image includes the UE 150 and the process proceeds to S111.

In S111, the beam management node 140 estimates the Signal to Interference plus Noise Ratio (SINR) for each UE in the captured image. This is achieved by dividing the strength of a signal from the first base station 110 at each UE by the strength of a signal from the second base station 120 at each UE. For example, the strength of a signal from the first base station 110 at the UE 150 may be estimated as:

$$\text{Transmitter Power} \times \text{Transmitter Gain} \times \text{Path Loss} \times \text{Receiver Gain} \quad (1)$$

Values for the transmitter power, transmitter gain and receiver gain may be known to the beam management node 140 or may be retrieved from the first base station 110 and UE 150 (which may be preferable to determining current values). The path loss may be determined based on the location of the UE 150 relative to the first base station 110 (derived from the estimated location of the UE 150 from S105 and the location of the first base station 110) and a suitable path loss model (which may be based on the frequency used in communications between the first base station 110 and the UE 150, the geography of the region between the first base station 110 and the UE 150 which may include local clutter, and the heights of the first base station 110 and UE 150). The strength of a signal from the second base station 120 at the UE 150 may be calculated using the same technique.

It is noted that, in an alternative implementation having more than one serving base station and/or more than one neighboring base station, the SINR may be estimated by dividing the sum of the strengths of signals from each serving base station at the UE 150 by the sum of the strengths of signals from each neighboring base station (that is, each base station that is not serving the UE 150 and is therefore an interferer) at the UE 150.

In the event the captured image contains a plurality of UE, then S110 is performed for each UE (based on that UE's location as determined in S105) to estimate the SINR of each UE of the plurality of UE.

In S113, the beam management node 140 determines whether the estimated SINR for each UE satisfies an SINR threshold. This SINR threshold may be configured to represent the SINR required to satisfy the service requirements. If the estimated SINR for all UE is above the SINR threshold, then the process ends (as this would indicate that all UE are still meeting its service requirements despite being subject to interference from the second base station 120). If the estimated SINR for at least one UE in the captured image is below the SINR, then the process proceeds to S115. In this example, the SINR for UE 150 is below the SINR threshold (indicating that the estimated SINR for the UE 150 is such that the UE 150 may not be satisfying its service requirements) and the process proceeds to S115.

In S115, the beam management node 140 determines alternative transmission parameters for the first and/or second base station 110, 120. In this example in which the captured image includes UE 150 only, this may be achieved by identifying a new transmission power for the first and/or second base station such that the estimated SINR for the UE 150 using this/these alternative transmission parameter(s)— estimated using equation 1 above—is above the SINR threshold. For example, the alternative transmission parameters may involve an adjustment to the transmission power of the second base station 120 so that the strength of a signal from the second base station 120 at the UE 150 is reduced. This may involve reducing the transmission power of the second base station 120 such that the second base station's coverage area no longer covers the UE 150.

In an example in which there are a plurality of UE in the captured image, then the determination of alternative transmission parameters for the first and/or second base station 110, 120 is such that the estimated SINR for each UE of the plurality of UE in the captured image when using these alternative transmission parameters is above the SINR threshold. If this is not possible, then this operation involves identifying alternative transmission parameters so as to maximize the number of UE having an estimated SINR above the SINR threshold.

In S117, the beam management node 140 sends an instruction message to each base station having alternative parameters determined in S115. In this example, the beam management node 140 sends an instruction message to the second base station 120 with an alternative parameter for the transmission power.

Turning to FIG. 6, in S119, each base station receiving alternative transmission parameters (the second base station 120 in this example) determines whether they serve any UE that would receive poor or no service following implementation of the alternative parameters. This may include a UE that was in the captured image but the alternative transmission parameters determined in S115 still resulted in an estimated SINR below the SINR threshold for that UE, and/or other UE that were not in the captured image and would also experience poor or no service following implementation of the alternative parameters. If so, then the process continues to S121. In this example, the second base station 120 determines that it does not serve a UE that would receive poor or no service following implementation of the alternative transmission parameters, so the process continues to S123.

In S123, each base station implements the alternative transmission parameters. In this example, the second base station 120 implements the alternative transmission parameters so as to reduce the transmission power of the antenna that transmits the first beam 120A (or of the plurality of antennas that cooperate to transmit the first beam 120A) so that the SINR of the UE 150 is above the SINR threshold. The state of the network following this reconfiguration is shown in FIG. 7.

This first embodiment benefits from utilizing real-time visual data to predict that the UE 150 is experiencing poor service due to a low SINR and take responsive action. This removes the need for the UE 150 to perform measurements of its radio environment and report these measurements to the first base station 110, thus reducing the processing resource, energy resource, and control signaling resource requirements in the network 100. Furthermore, this first embodiment may react more quickly and be more accurate than the prior art solution of measuring the UE's radio environment and providing a measurement report. The improved accuracy may be realized as users that are not communicating with the serving base station (i.e., they are in IDLE mode) would not be able to perform measurements of the signal strength for user plane resources. In a scenario in which a new service is requested by an IDLE mode user, the present disclosure may therefore be proactive in estimating that the SINR for this service would not satisfy the SINR threshold (whereas the prior art method must initiate data transfer, measure the SINR, and then react to the SINR being below the SINR threshold).

Returning to S119 above, an alternative scenario in which the second base station 120 determines that it does serve a UE that would receive poor or no service following implementation of the alternative transmission parameters will now be described. In this scenario, the process proceeds to S121 in which the second base station 120 transfers this UE to a new serving base station (e.g. by coordinating a handover of the UE). This may be based on a measurement report for the UE.

A second embodiment of the present disclosure will now be described. This second embodiment is substantially the same as the first embodiment but differs in that the location of the object is detected by the camera at a plurality of time instances to determine a path of the object. The path of the object may then be used to predict a future location (or a plurality of future locations) of the object. The accuracy of these future location predictions may be improved by correlating the path with mapping data, such as road maps, railway maps and footpath maps. The remaining operations of the second embodiment mirror those of the first embodiment but are based on the one or more future locations of the object. The beam management node 140 may estimate the SINR of the UE 150 at each of the future locations of the UE 150. The estimated SINR at each future location of the UE 150 may then be compared to the SINR threshold. If the estimated SINR falls below the SINR threshold at any of these future locations then alternative transmission parameters may be implemented prior to the UE's arrival at these future locations. This second embodiment therefore additionally benefits from taking pre-emptive action to prevent the UE 150 experiencing poor service due to interfering signals from a neighboring base station.

A third embodiment of the present disclosure will now be described. This third embodiment may be based on the same operations as either the first or second embodiment, but differs in that the estimation of SINR further accounts for the way in which the UE 150 is being held by the user. This will now be explained.

In this third embodiment, the beam management node 140 includes a database of antenna radiation patterns which each define the receiver gain as a function of angle of arrival of a signal at the receiver. Each antenna radiation pattern in the database is associated with a particular holding form. In this context, a holding form defines how the user is holding the UE, which may be, for example, in a "browsing position" when the user is holding the UE in front of their body in one or both hands, or a "talking position" when the user is holding the UE to one side of their head. The antenna radiation pattern may differ for each holding form due to a change in antenna properties and the different amount of attenuation at each angle of arrival caused by the passage of the signal through the body. In this example, the database includes antenna radiation patterns for a plurality of holding forms including 'talking position, right hand' (that is, the UE is held to the right side of the user's head), 'talking position, left hand' (that is, the UE is held to the left side of the user's head), 'browsing position, right hand' (that is, the UE is held in front of the user in the user's right hand) and 'browsing position, left hand' (that is, the UE is held in front of the user in the user's left hand).

Each antenna radiation pattern may be determined in a calibration environment to define the receiver gain for the UE at all possible angles of arrival (relative to a reference, such as due North) when using a particular holding form.

Furthermore, the database of visual training data for the learning agent 143a of the beam management node 140 identifies, for each training image, whether a UE is present in the image and, if so, the holding form of the UE in that training image. The learning agent 143a of the beam management node 140 is therefore configured to train the classification model to map between each training image from the database and the corresponding identifier of whether a UE is present or not in the training image (and, if present, the holding form).

In a method of this third embodiment, in S109, the beam management node 140 may process each image received from the optical camera 130 to determine whether a UE is present in the image and, if so, the holding form of that UE. The beam management node 140 is also configured to determine the absolute bearing angle of each UE in the image. This may be determined by training the classification model using training images of the UE at different absolute bearings for each holding form, such that the trained classification model may be used to determine whether a UE is present in the image and, if so, the holding form and absolute bearing of that UE. In another example implementation, the absolute bearing of the UE may be calculated by determining the direction the user is facing in the image and comparing this to the known absolute bearing of the optical camera 130.

Subsequently, in S111, the beam management node 140 estimates the SINR for the UE in which the receiver gain is calculated based on the UE's holding form. That is, based on the UE's holding form, a lookup operation may be performed with the database of antenna radiation patterns to retrieve the antenna radiation pattern associated with that UE holding form. An angle of arrival of a signal at the UE 150 from the first base station 110 may then be determined based on the locations of the UE 150 and first base station 110 and the absolute bearing of the UE 150. The retrieved antenna radiation pattern, which defines the receiver gain as a function of angle of arrival, may then be used to determine the receiver gain for the UE 150 for signals from the first base station 110. The strength of a signal from the first base station 110 at the UE 150 may then be estimated using this receiver gain.

The strength of a signal from the second base station 120 at the UE 150 may be determined in a similar manner based on the receiver gain as a function of the angle of arrival of a signal at the UE 150 from the second base station 120 using the same antenna radiation pattern.

The third embodiment may then follow the same operations as the first or second embodiment to determine whether the estimated SINR is below a threshold and, if so, take responsive or pre-emptive action. This third embodiment therefore provides an additional benefit in that the SINR may be more accurately predicted by factoring in the holding form of the UE as detected by the beam management node 140 based on the image captured by the optical camera 130.

In a variation of the third embodiment above, the holding form of the UE may only be a factor in the SINR estimation for a subset of UE (such as those using a particular frequency of communication having a significant performance difference for different holding forms).

Furthermore, the receiver gain estimate may be even more accurate by using antenna radiation patterns that are even more specific to the scenario, such as being for a particular frequency of communication or a particular UE antenna arrangement.

The skilled person will understand that the above embodiment applies to any form of wireless telecommunications network, such as a wireless local area network or wireless wide area network.

In the above embodiments, the beam management node 150 is a core networking node. However, this is non-essential. For example, the beam management node may be a module of a Radio Access Node (RAN) Intelligent Controller (RIC).

In the above embodiment, an optical camera is used to detect an object in the coverage area of a base station. However, this is non-essential, and any other suitable sensor for detecting an object and estimating the location of the object may be used (such as a LIDAR sensor).

In the above embodiment, the neighboring base station was instructed to reduce its transmission power so as to improve the SINR for the UE. However, this is not the only way in which the SINR for the UE may be improved. For example, the transmission power of the serving base station may be increased. Furthermore, the SINR may be improved by changing the beam angle of the serving base station and/or neighboring base station. In another example, the serving and/or neighboring base station may use an alternative frequency so as to change the receiver gain and improve the SINR for the UE.

The skilled person will also understand that it is non-essential that the beam management node 140 estimates the SINR. That is, any other measure of relative signal strength representing the relative strengths of the one or more signals from one or more serving base stations to one or more signals from one or more neighboring base stations may be used.

In the above embodiments, the optical camera included a GNSS module. However, this is non-essential as the optical camera's location may be known to the beam management node by pre-configuration or may be determined by other means (such as by using a location estimation technique of a cellular telecommunications protocol). Furthermore, it is non-essential that an absolute location is used in the estimation of relative signal strength, as relative distances between the base stations and UE may be used to estimate the relative signal strengths.

In the above embodiments, the beam management node may need to identify a UE in the image in order to determine the base station(s) that is/are serving that UE and the base station(s) that is/are not serving the UE. This may be achieved by the base stations sending data relating to their served UEs to the beam management node, which may contain visual characteristics of the UE (such as make and model) and an approximate location of the UE (e.g. based on a beam identifier). The beam management node may use this information to identify a UE. If the UE cannot be uniquely identified, such that the UE in the image may be served by one of a plurality of base stations, then the alternative transmission parameters may be calculated so as to improve the SINR for each scenario. The UE may also be identified by sending an instruction to each UE to emit a particular sequence of light pulses (the sequence being specific to its served base station) so that the base station serving the UE can be identified from the sequence.

The skilled person will understand that any combination of features is possible within the scope of the disclosure, as claimed.

The invention claimed is:

1. A method of operating a network node in a wireless telecommunications network that includes a first access point configured to transmit in a first coverage area, a second access point configured to transmit in a second coverage area, and a first User Equipment (UE) connected to the first access point, the method comprising:
   calculating a first distance between the first access point and the first UE and a second distance between the second access point and the first UE;
   detecting a holding form of the first UE;
   calculating, based on the first distance and the second distance and further based on the holding form of the first UE, a relative strength of a first signal between the UE and the first access point relative to a second signal between the first UE and the second access point;
   determining that the relative strength is below a threshold;
   determining at least one of a first transmission parameter for the first access point or a second transmission parameter for the second access point such that the relative strength of the first signal between the first UE and the first access point relative to the second signal between the first UE and the second access point when implementing at least one of the first transmission parameter or the second transmission parameter is above the threshold; and
   causing a reconfiguration of at least one of the first access point or the second access point to implement at least one of the first transmission parameter or the second transmission parameter.

2. The method as claimed in claim 1, wherein the first distance is between the first access point and a future location of the first UE and the second distance is between the second access point and the future location of the first UE, and causing the reconfiguration of at least one of the first access point or the second access point is performed prior to the first UE arriving at the future location.

3. The method as claimed in claim 1, further comprising obtaining data captured by an optical source, wherein the first distance and the second distance are calculated from the obtained data.

4. The method as claimed in claim 3, wherein the obtained data is a visual image.

5. The method as claimed in claim 3, wherein the optical source is an Internet of Things (IoT) sensor.

6. A non-transitory computer-readable storage medium storing a computer program comprising instructions which, when the computer program is executed by a computer, cause the computer to carry out the method of claim 1.

7. A computer system comprising at least one processor and memory storing a computer program configured to carry out the method of claim 1.

8. A network node for a wireless telecommunications network comprising a processor configured to carry out the method of claim 1.

9. A system for a wireless telecommunications network comprising one or more nodes configured to carry out the method of claim 1.

* * * * *